US007488120B2

(12) United States Patent
Oen et al.

(10) Patent No.: US 7,488,120 B2
(45) Date of Patent: Feb. 10, 2009

(54) FIBER OPTIC MODULE AND OPTICAL SUBASSEMBLY WITH REDUCED ELECTROMAGNETIC INTERFERENCE

(75) Inventors: Josh Oen, Fremont, CA (US); Hengju Cheng, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 67 days.

(21) Appl. No.: 11/322,083

(22) Filed: Dec. 29, 2005

(65) Prior Publication Data

US 2007/0154148 A1  Jul. 5, 2007

(51) Int. Cl.
G02B 6/36 (2006.01)
(52) U.S. Cl. .......................................... 385/92; 385/88
(58) Field of Classification Search .................. None
See application file for complete search history.

(56) References Cited

U.S. PATENT DOCUMENTS 6,439,781 B1  8/2002  Gaio et al.

| | | | |
|---|---|---|---|
| 2002/0153053 A1 | 10/2002 | Chiu et al. | |
| 2003/0152331 A1* | 8/2003 | Dair et al. | 385/59 |
| 2003/0236019 A1 | 12/2003 | Hanley et al. | |
| 2004/0047564 A1 | 3/2004 | Chiu et al. | |
| 2004/0151505 A1* | 8/2004 | Aronson et al. | 398/138 |
| 2005/0036747 A1* | 2/2005 | Togami et al. | 385/92 |
| 2005/0286839 A1* | 12/2005 | Yoshikawa | 385/92 |
| 2006/0263013 A1* | 11/2006 | Sone | 385/89 |
| 2007/0110374 A1 | 5/2007 | Oki et al. | |

FOREIGN PATENT DOCUMENTS

WO    WO 99/54772    10/1999

OTHER PUBLICATIONS

PCT International Search Report (Oct. 17, 2007).

* cited by examiner

*Primary Examiner*—Frank G Font
*Assistant Examiner*—Eric Wong
(74) *Attorney, Agent, or Firm*—Blakely, Sokoloff, Taylor & Zafman LLP

(57) ABSTRACT

According to one embodiment of the invention, a fiber optic module comprises a chassis and an optical subassembly housed within the chassis. The optical subassembly includes a housing having a channel formed within the housing for placement of at least one extrusion of the chassis within the channel.

16 Claims, 5 Drawing Sheets

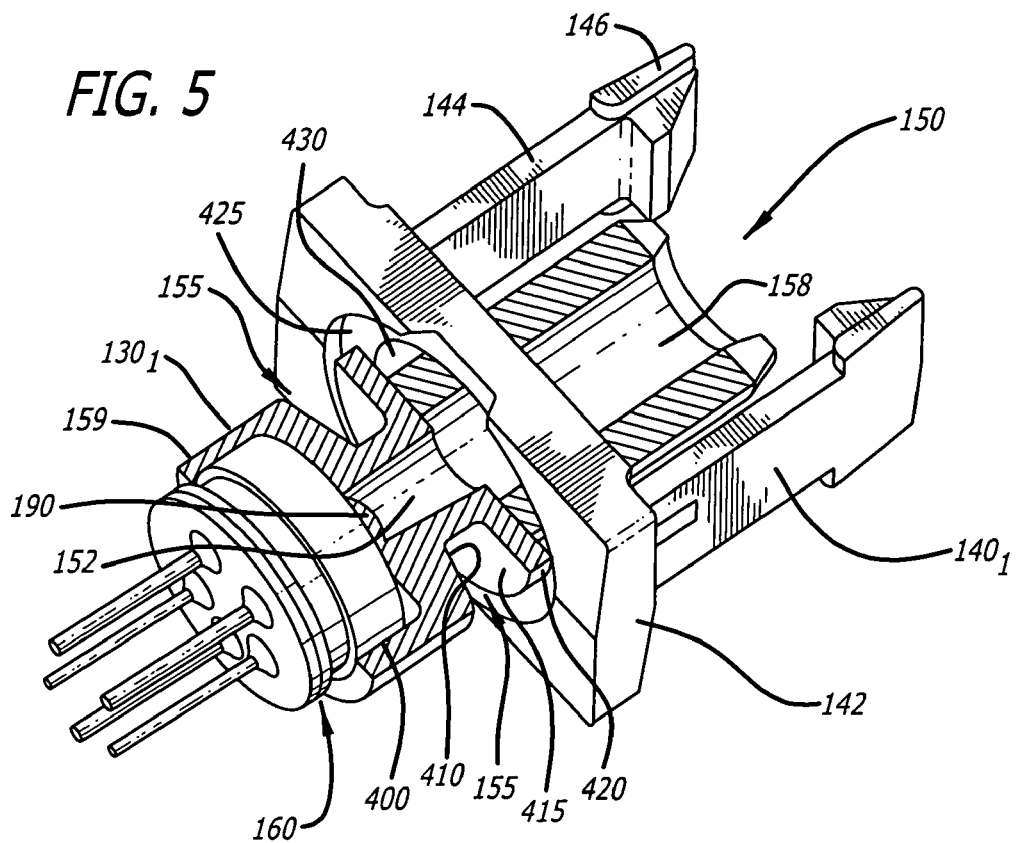
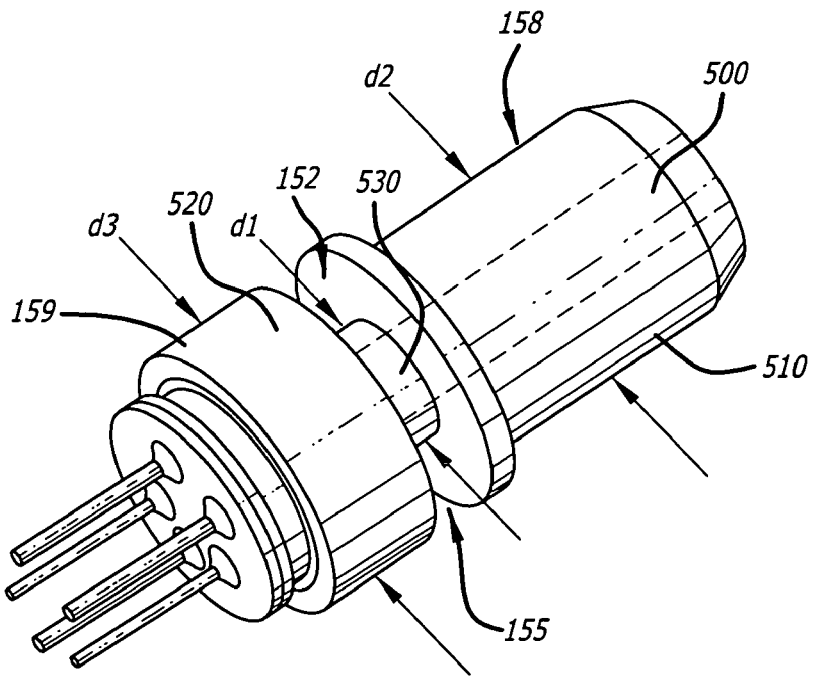

FIBER OPTIC MODULE AND OPTICAL SUBASSEMBLY WITH REDUCED ELECTROMAGNETIC INTERFERENCE

FIELD

Embodiments of the invention relate to the field of communications, and more particularly to an optical subassembly that includes a plastic lens port notched to receive a portion of the fiber optic module chassis.

GENERAL BACKGROUND

Currently, high-speed communications rely on fiber optics for high data transmission rates and high bandwidth capacities. Through fiber optics, light emitting diodes (LEDs) and lasers are adapted to produce digital data in the form of light signals. These light signals are propagated through a fiber optic cable and, at some point, are converted back to electrical signals for processing. Optical subassemblies are used for this data conversion.

One type of optical subassembly is referred to as a transmitter optical subassembly or "TOSA". The TOSA includes an electrical interface for receiving electrical signals, a data encoder/modulator adapted to convert the electrical signals into suitable optical signals, and a light emitting diode or laser to produce light pulses that form a light signal. Thereafter, the light signal passes through a lens for transmission over an optical fiber.

Similarly, a receiver optical subassembly (ROSA) is used to translate light signals into electrical signals. Conventionally, a ROSA comprises an optical fiber receptacle and a photodiode. Typically, the light exiting an optical fiber in the optical fiber receptacle is so divergent that it needs to be collimated or otherwise focused onto the photodiode by a lens.

In an effort to reduce the costs of fiber optic modules, optical subassemblies, most commonly ROSAs, have been implemented with plastic housings. While a plastic ROSA housing is cost effective and less sensitive to electrostatic discharge, it experiences increased electromagnetic interference (EMI) leakage. More specifically, electromagnetic (EM) waves inside the module can permeate through plastic and escape through openings within the fiber optic module, thereby causing the failure in passing Federal Communications Commission (FCC) EMI requirements.

BRIEF DESCRIPTION OF THE DRAWINGS

Embodiments of the invention may best be understood by referring to the following description and accompanying drawings that are used to illustrate various features of the embodiments of the invention.

FIG. 5 is a cross-sectional view of an exemplary embodiment of the optical subassembly of FIG. 2 along with a corresponding latch assembly.

FIG. 6 is an exemplary embodiment of a perspective view of an optical subassembly in accordance with one embodiment of the invention.

DETAILED DESCRIPTION

Herein, certain embodiments of the invention relate to an optical subassembly including a housing with a channel adapted to receive extrusions from a chassis of a fiber optic module.

In the following description, certain terminology is used to describe features of the invention. For example, the term "fiber optic module" is generally defined as any device that supports data communications through the transmission of light signals. The fiber optic module may be implemented with one or more optical subassemblies such as a fiber optic transmitter, a fiber optic receiver, or a fiber optic transceiver to both transmit and receive light signals. Examples of fiber optic modules may include, but are not limited or restricted to various types of networking equipment (e.g., routers, bridges, switches, routers, etc.), computers, set-top boxes or the like.

An "optical subassembly" is a device that performs the conversion between a light signal and an electrical signal. Different types of optical subassemblies include a transmitter optical subassembly (TOSA) and a receiver optical subassembly (ROSA). An "interconnect" is generally defined as any information-carrying medium that is adapted to transmit light signals such as optical fiber for example. "Logic" is electronic hardware, software or a combination thereof.

In the following description, numerous specific details are set forth such as measured dimensions. However, it is understood that embodiments of the invention may be practiced without these specific details. Moreover, in other instances, well-known circuits, structures and techniques have not been shown or described in detail in order not to obscure the understanding of this description.

Figure 1:
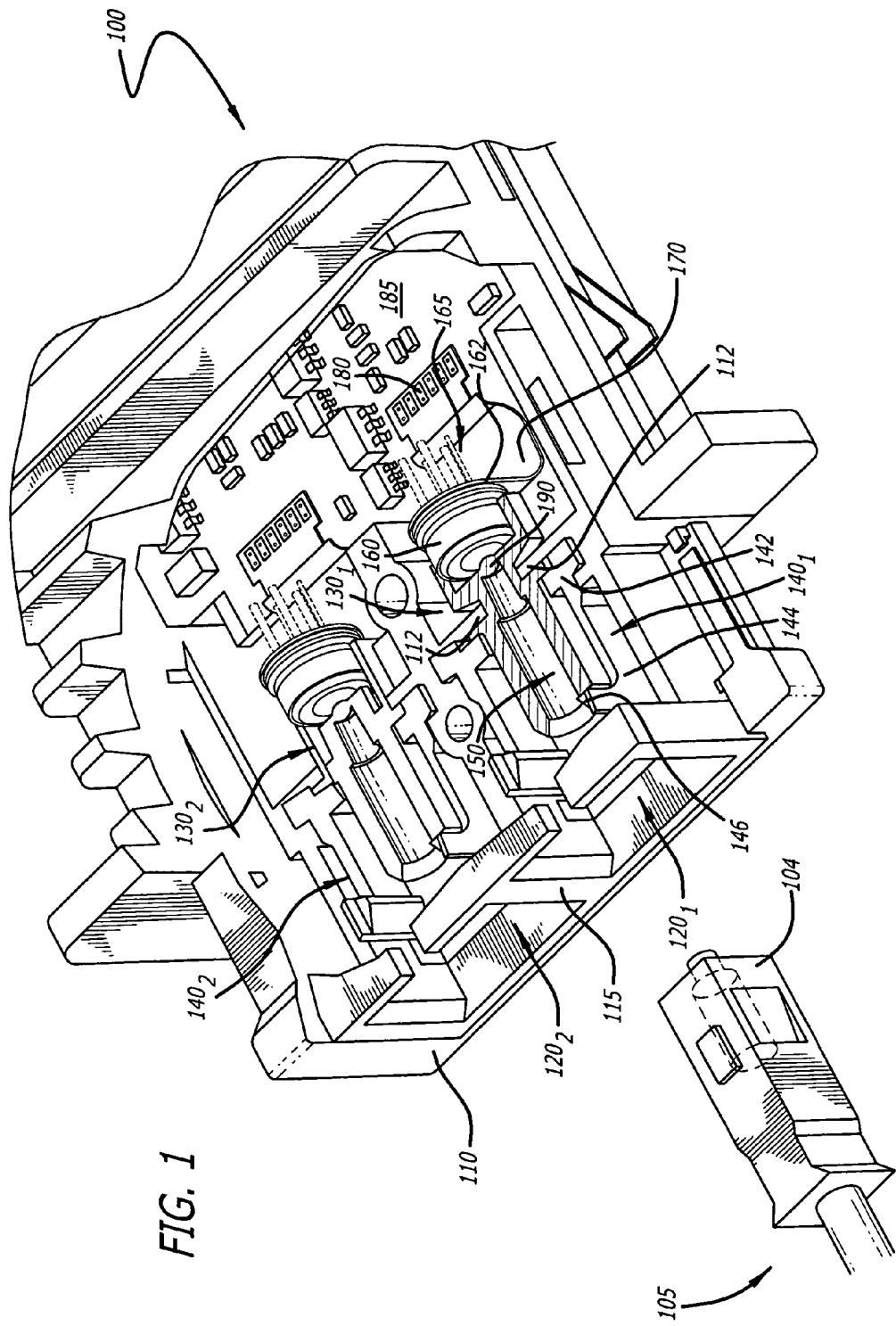
FIG. 1 is a top, cut-away view of a fiber optic module in accordance with one embodiment of the invention.

Referring now to FIG. 1, an exemplary embodiment of a fiber optic module 100 is shown. Fiber optic module 100 comprises a chassis 110 made of a conductive material such as die cast metal for example. Chassis 110 includes one or more openings $120_1$-$120_N$ (N≧1) placed along a first (front) sidewall 115 of chassis 110. According to this embodiment of the invention, a plurality of openings $120_1$ and $120_2$ are implemented, where a first opening $120_1$ enables an interconnect to be coupled to an optical subassembly $130_1$. Similarly, a second opening $120_2$ enables an interconnect to be coupled to a different optical subassembly, namely optical subassembly $130_2$.

As shown in FIG. 1, optical subassembly $130_1$ is accompanied by a latch assembly $140_1$, which is made of an elastic material (e.g., plastic). Similarly, latch assembly $140_2$ accompanies optical subassembly $130_2$. For clarity sake, the construction of optical subassembly $130_1$ and its corresponding latch assembly $140_1$ will be discussed in detail since optical subassembly $130_2$ may be made of a conductive metal, and therefore, does not rely on additional chassis extrusions near the lens port area to reduce EMI leakage. Of course, it is contemplated that both optical subassembly $130_2$ and latch assembly $140_2$ may be manufactured in an identical manner as optical subassembly $130_1$ and latch assembly $140_1$, respectively.

Herein, as shown in FIG. 1, latch assembly $140_1$ comprises a base 142 and a pair of guide arms 144 coupled to base 142. Each guide arm 144 is positioned a predetermined distance from an outer surface of optical subassembly $130_1$. According to one embodiment of the invention, these guide arms 144 are forced apart upon insertion of a connector 104 of a fiber optic cable 105 through opening $120_1$. Upon insertion through opening $120_1$, connector 104 operates as a sleeve to surround a barrel portion of optical subassembly $130_1$ (described below) so that the housing of connector 104 is interposed between guide arms 144 and an outer surface of optical subassembly $130_1$. Clamping ends 146 of guide arms 144 secure connector 104 to optical subassembly $130_1$ in order to provide appropriate propagation of light signals between such equipment.

As further shown in FIG. 1, according to one embodiment of the invention, optical subassembly $130_1$ comprises a housing 150 and logic adapted to perform conversation of a light signal into electrical signals (and vice versa for TOSA implementation). Herein, this conversion logic is contained within a TO-can 160, but may be contained in another type of storage unit.

According to one embodiment of the invention, where optical subassembly 130 features ROSA packaging, the conversion logic implemented within TO-can 160 includes at least a photodiode that is configured to detect and convert light pulses of an incoming light signal, propagated by fiber optic cable 105, into electrical signals for routing to circuitry within fiber optic module 100. Of course, when optical subassembly $130_1$ is a transmitter featuring TOSA packaging, the conversion logic implemented within TO-can 160 may include at least a laser diode that, in response to incoming electrical signals, generates light pulses routed through optical subassembly $130_1$ and over fiber optic cable 105.

For this embodiment of the invention, TO-can 160 includes a plurality of leads 165 extending from its backside 162. As represented by dashed lines, leads 165 are shortened and coupled to a flexible (flex) circuit 170. Flex circuit 170 operates as an interconnect by providing a prescribed routing of electrical signals from leads 165 to a plurality of pads 180 of a circuit board 185. For instance, with a ROSA optical subassembly $130_1$, flex circuit 170 routes converted electrical signals from TO-can 160 to circuit board 185. With a TOSA optical subassembly $130_1$, flex circuit 170 routes electrical signals from circuit board 185 for conversion into light pulses by logic within TO-can 160.

Figure 2:
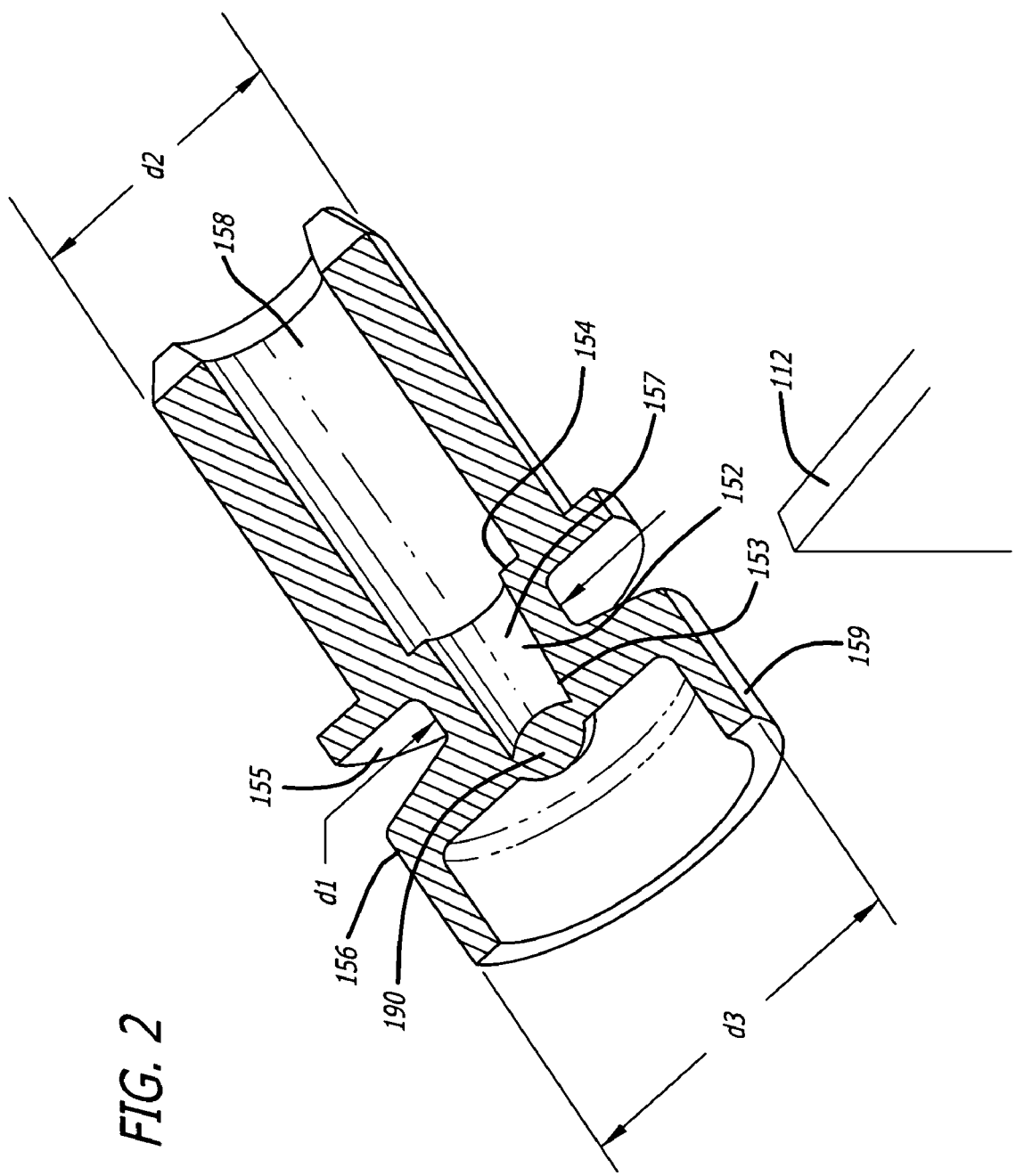
FIG. 2 is a cross-sectional view of an optical subassembly of FIG. 1.

As further shown in FIGS. 1 and 2, housing 150 is made of a non-conductive material (e.g. plastic) and comprises a lens port 152, a barrel portion 158 and a holding member 159. Positioned between barrel portion 158 and holding member 159, lens port 152 has a width (d1) than the width of barrel portion 158 (d2) and holding member 159 (d3), where d1<d2<d3. For instance, according to one embodiment of the invention, housing has a cylindrical shape so that lens port (d1) has a diameter of approximately three millimeters (mm), which is less than the barrel diameter (d2) of approximately 4.75 mm and holding member diameter (d3) of approximately 6.4 mm.

According to one embodiment of the invention, as shown, a lens 190 is an integral part of housing 150. Lens 190 is positioned toward a first end 153 of lens port 152 in close proximity to conversion logic (e.g., photodiode, laser diode, etc.) of optical subassembly $130_1$. Lens 190 may be oriented to focus or collimate light to the conversion logic implemented within TO-can 160. A second end 154 of lens port 152 is proximate to barrel portion 158.

As an alternative embodiment, lens 190 may be implemented within TO-can 160. As a result, first end 153 would feature an aperture sized to allow light to be directed through this aperture.

It is contemplated that housing 150 may be a single piece of molded plastic having a channel 155 formed within an outer surface 156 of lens port 152. According to one embodiment of the invention, channel 155 features a width of one or more millimeters "mm" (e.g., approximately 1.5 mm) and a depth sufficient to receive one or more extrusions 112 of chassis 110 for grounding purposes. The depth of channel 155 may cause a reduction in the width of interior chamber 157 of lens port 152, but the chosen depth will not disrupt the propagation of light within interior chamber 157 of lens port 152.

According to one embodiment of the invention, channel 155 may be a continuous groove made in outer surface 156 over a substantial portion of the circumference of lens port 152 or may be multiple discontinuous grooves. As shown in this embodiment of the invention, channel 155 is placed along outer surface 156 of lens port 152 so that extrusions 112 are positioned within channel 155 and are located between barrel portion 158 and holding member 159 as well as between latch assembly $140_1$ and any one of holding member 159, lens 190 or TO-can 160.

However, as an alternative embodiment of the invention, it is contemplated that channel 155 may be formed in holding member 159 or perhaps formed in lens port 152 and holding member 159 so that additional chassis ground can be applied to optical subassembly $130_1$. While channel 155 may be extended to barrel portion 158, this would require a reconfiguration of the optical connector for fiber optic cable 105. Moreover, as an additional alternative embodiment, channel 155 may be adapted to receive an insert with conductive material (e.g. metal, plastic with conductive filler, plastic with a coating of conductive material, etc.) that is not part of chassis 110.

Figure 3:
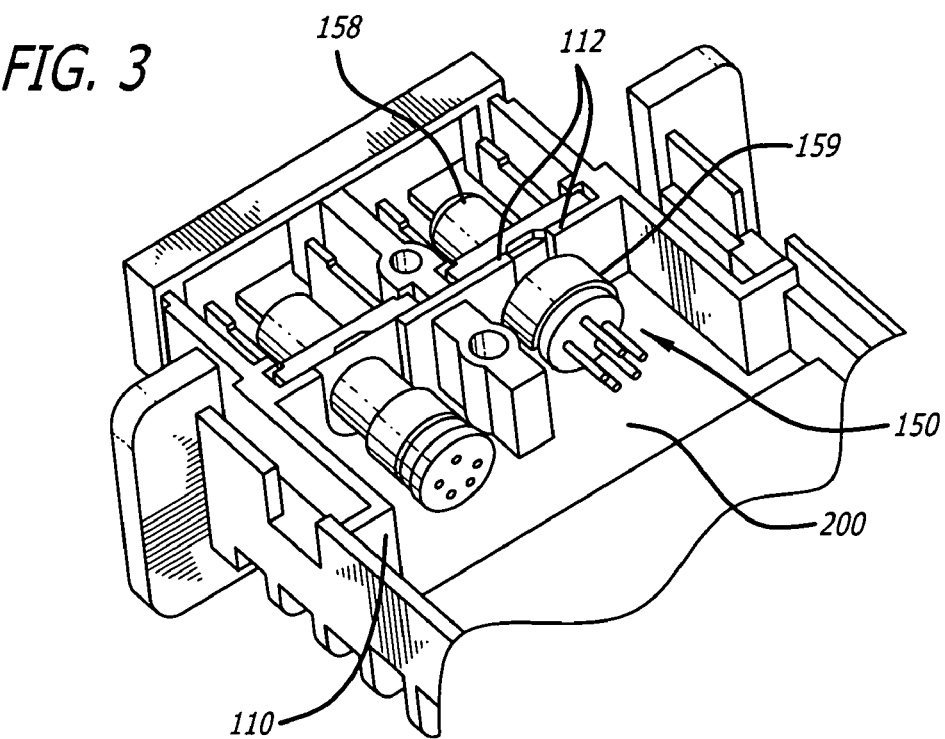
FIG. 3 is a bottom, cut-away view of a fiber optic module in accordance with one embodiment of the invention.

Referring now to FIG. 3, an exemplary embodiment of a backside 200 of chassis 110 for fiber optic module 100 is shown. In general, chassis 110 is configured with extrusions 112 that are positioned for engagement with a channel of FIGS. 1 and 2 formed along the outer surface of housing 150 for optical subassembly $130_1$. As shown for this embodiment of the invention, the channel placed along an outer surface of the lens port, which is a portion of housing 150 between barrel portion 158 and holding member 159 as shown in FIG. 2. Of course, it is contemplated that extrusions 112 may be formed of a conductive material that differs from chassis 110.

Figure 4:
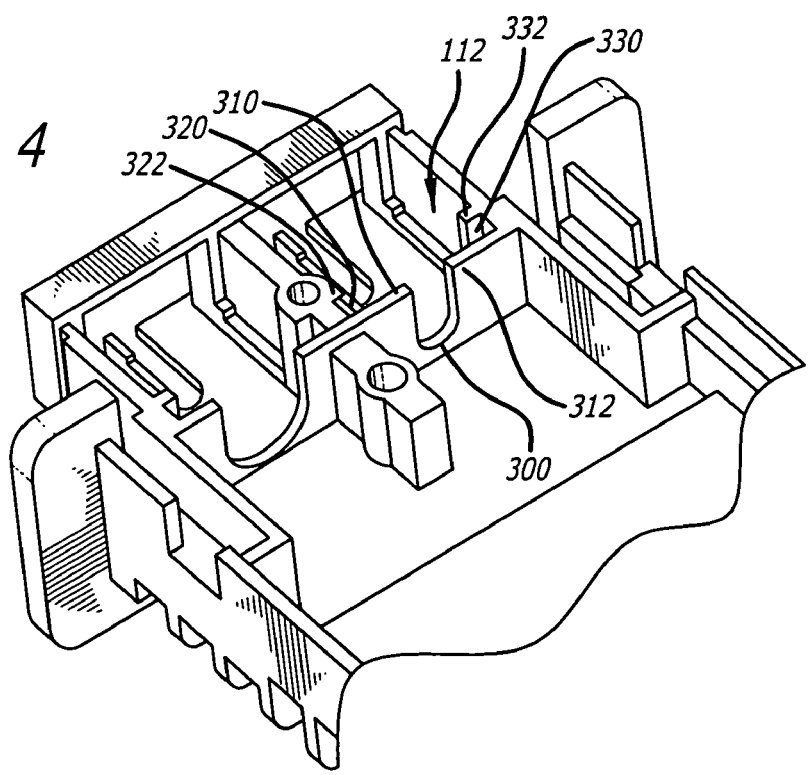
FIG. 4 is a bottom, cut-away view of the fiber optic module of FIG. 3 with the optical subassemblies removed.

As shown in FIG. 4, extrusions 112 partially form a substantially U-shaped recessed passage of a first chassis support wall 300. For this recessed passage, the distance between a first extrusion 310 and a second extrusion 312 is slightly greater than width (d1) but less than the width (d2) of barrel portion 158 as well as the width (d3) of holding member 159. For instance, according to one embodiment of the invention, the distance between first and second extrusions 310 and 312 may be approximately 3.3 mm. Herein, first and second extrusions 310 and 312 and optionally the portion of first chassis support wall interconnecting extrusions 310 and 312 are collectively referred to as "extrusions 112".

A first slot 320 is formed between a first extrusion 310 and an extrusion 322 of a second chassis support wall 325. Similarly, a second slot 330 may be formed between second extrusion 320 and an extrusion 332 of a second sidewall 335 of chassis 110. First slot 320 and second slot 330 are sized to receive and secure base 142 of latch assembly $140_1$ of FIG. 1.

Referring now to FIG. 5, a cross-sectional view of an exemplary embodiment of optical subassembly $130_1$ and latch assembly $140_1$ is shown. As described above, latch assembly $140_1$ includes base 142, guide arms 144 and clamping ends 146 to ensure coupling between a connector of the fiber optic cable (not shown) and optical subassembly $130_1$.

Herein, optical subassembly $130_1$ comprises housing 150 that securely retains TO-can 160 that includes light-to-electrical signal conversion logic and/or electrical-to-light signal conversion logic. Leads 165 of TO-can 160 are adapted for routing electrical signals to/from conversion logic within TO-can 160.

More specifically, housing 150 comprises holding member 159 that is sized to securely retain TO-can 160. Holding member 159 includes a sidewall 400 positioned to surround a perimeter of TO-can 160 when inserted into housing 150. Insertion of TO-can 160 into holding member 159 aligns conversion logic (e.g., photodiode or laser diode) with lens 190.

Housing 150 further comprises lens port 152 that is positioned between holding member 159 and barrel portion 158. Lens port 152 includes channel 155 formed along its outer surface and sized to receive at least one chassis extrusion 112 of FIG. 1. Channel 155 features a first wall 410 and a second wall 415. Second wall 415 partially forms a flange portion 420 of lens port 152 that is sized to rest within a recessed portion 425 formed within base 142 of latch assembly $140_1$. Thus, an opening 430 through base 142 is sized to enable barrel portion 158 to be inserted there through, but lens port 152 is precluded from being inserted through base 142 via opening 430.

Referring now to FIG. 6, a perspective view of an exemplary embodiment of optical subassembly $130_1$ is shown. Formed as a single piece or multiple pieces of molded plastic, housing 150 includes barrel portion 158 having a diameter d2, lens port 152, a holding member 159 having a diameter d3 (d3>d2) and an integrated lens 190.

As shown, barrel portion 158 is configured as a cylindrical conduit for light signals, including an interior chamber 500 surrounded by an exterior surface 510. A connector of a fiber optic cable (not shown) is positioned to surround exterior surface 510 of barrel portion 158. Hence, light signals from a fiber optic interconnect are routed through interior chamber 500.

Lens port 152 is positioned adjacent to barrel portion 158. Lens port 152 includes an outer surface 156 and an interior chamber 157 having a diameter less than the diameter of interior chamber 500 of barrel portion 158. Channel 155 is notched into outer surface 156 so as to engage with extrusions from the chassis, but these extrusions do not penetrate into interior chamber 157. In other words, the depth of channel 155 is less than the width of the material forming outer surface 156.

Figure 7:
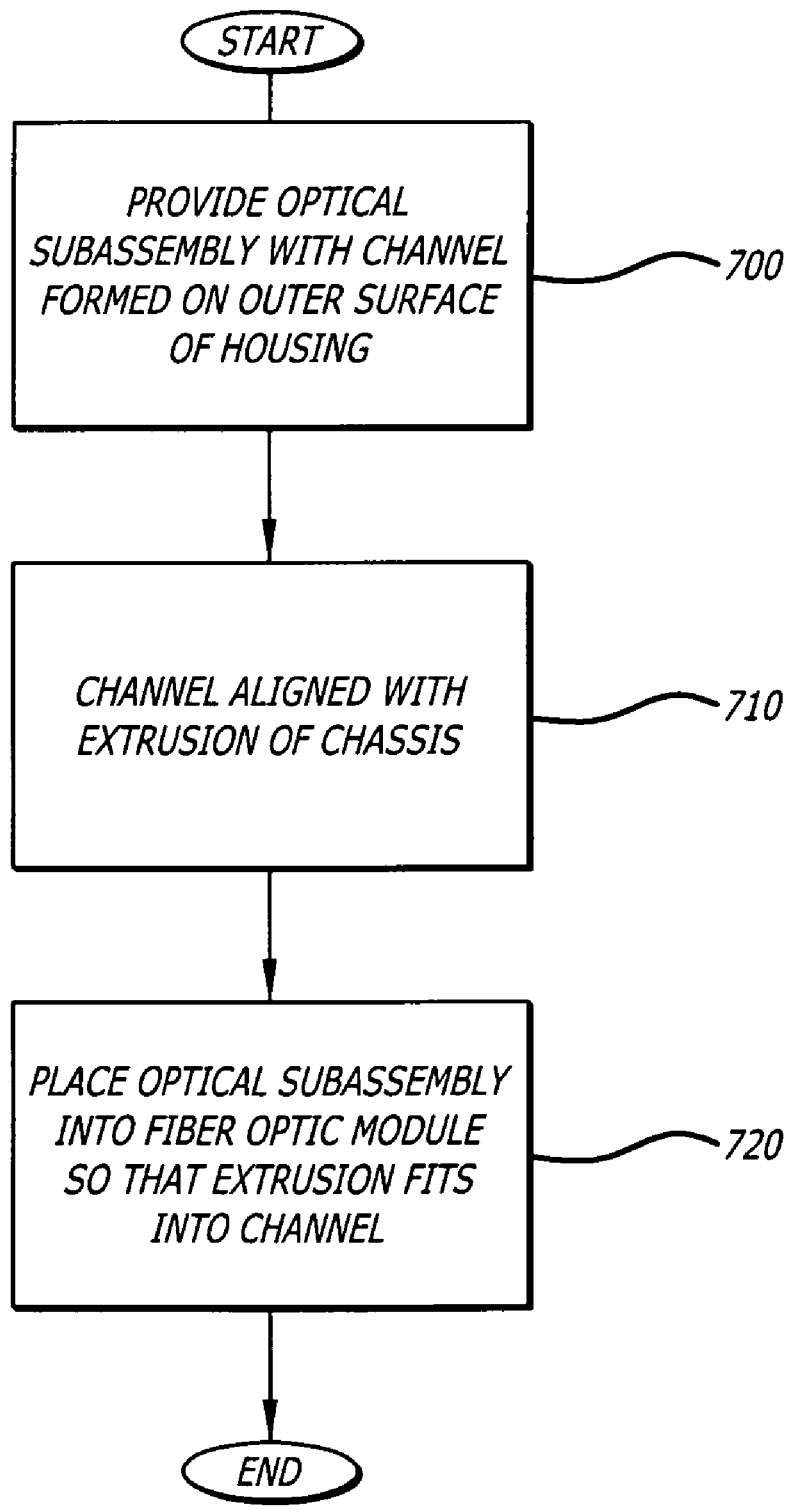
FIG. 7 is an exemplary flowchart of the implementation of the optical subassembly of FIG. 6.

Referring now to FIG. 7, an exemplary flowchart of the implementation of the optical subassembly of FIG. 6 is shown. Initially, an optical subassembly is provided with a channel formed within an outer surface of the housing of the optical subassembly (block 700). As an illustrative example, the channel may be formed proximate to the lens port. Prior to insertion of the optical subassembly into the fiber optic module, the channel is aligned with one or more extrusions of the chassis (block 710). Made of a conductive material (e.g., metal), these extrusions are fitted into the channel upon insertion and placement of optical subassembly into the fiber optic module (block 720). This results in a reduction of EMI leakage.

While the invention has been described in terms of several embodiments of the invention, those of ordinary skill in the art will recognize that the invention is not limited to the embodiments of the invention described, but can be practiced with modification and alteration within the spirit and scope of the appended claims. The description is thus to be regarded as illustrative instead of limiting.

What is claimed is:

1. A fiber optic module comprising:
   a chassis; and
   an optical subassembly housed within the chassis, the optical subassembly including a housing, the housing comprises a lens port positioned to be aligned with and between a lens and a barrel portion of the housing, the lens port including (i) an outer surface surrounding an interior chamber that propagates light from signal conversion logic positioned in a holding member to the barrel portion via the lens, and (ii) a channel formed in the outer surface of the housing so as to reduce a width of the interior chamber and receive at least one extrusion of the chassis within the channel.

2. The fiber optic module of claim 1, wherein the at least one extrusion of the chassis being made at least in part of a conductive material.

3. The fiber optic module of claim 1, wherein the at least one extrusion of the chassis includes a pair of extrusions formed on opposite sides of the housing, the pair of extrusions being made at least in part of a conductive material inserted into the channel formed within the optical subassembly.

4. The fiber optic module of claim 1, wherein the at least one extrusion of the chassis is made at least in part of a conductive material and resides in a substantial portion of the channel formed around a lens port of the housing.

5. The fiber optic module of claim 1, wherein the chassis comprises a first sidewall including at least one opening to allow an optic fiber cable to be coupled to the barrel portion of the housing of the optical subassembly.

6. The fiber optic module of claim 1, wherein the first sidewall of the chassis is substantially in parallel with the at least one extrusion of the chassis.

7. The fiber optic module of claim 1, wherein the at least one extrusion of the chassis is part of a support wall positioned substantially traverse to a direction of orientation of the optical subassembly and the at least one extrusion is the part of the support wall forming a recessed portion of the support wall that is inserted into the channel formed in the optical subassembly.

8. An optical subassembly comprising:
   conversion logic; and
   a housing including (i) a holding member to retain the conversion logic, (ii) a barrel portion, and (iii) a lens port positioned between the barrel portion and the holding member, the housing includes a channel that is formed on an outer surface of the lens port and the barrel portion and is sized to receive an insert including conductive material, the channel being a groove formed by a plurality of side walls so that a diameter of the outer surface of the lens port at the channel is less than a diameter of the outer surface at the barrel portion.

9. The optical subassembly of claim 8, wherein the insert is a portion of a chassis of a fiber optic module within which the optical subassembly is implemented.

10. The optical subassembly of claim 8, wherein the channel formed on the outer surface of the housing is a continuous groove formed around a circumference of the lens port of the housing.

11. The optical subassembly of claim 8, wherein the conversion logic includes a photodiode when the optical subassembly operates as a receiver.

12. The optical subassembly of claim 8, wherein the conversion logic includes a laser diode when the optical subassembly operates as a transmitter.

13. The optical subassembly of claim 8, wherein the conversion logic is implemented within a TO-can.

14. The optical subassembly of claim 13, wherein the TO-can is secured by the housing member situated at a first end of the housing and a second end of the housing is adapted for coupling with a connector of a fiber optic cable.

15. A method comprising:
   providing an optical subassembly including a housing that comprises a lens port including a lens positioned at a first end of the lens port and a barrel portion positioned at a second end of the lens port, the lens port including a channel formed on an outer surface of the lens port, the channel being a groove formed by a plurality of sidewalls of substantially equal depth; and placement of an insert into the channel of the housing to reduce electromagnetic interference (EMI), the insert being made at least in part of conductive material.

16. The method of claim 15, wherein placement of the insert include inserting the optical subassembly into a chassis of a fiber optic module where a portion of the chassis, operating as the insert, is positioned within the channel.

* * * * *